United States Patent

Guillermin et al.

[11] Patent Number: 5,802,731
[45] Date of Patent: Sep. 8, 1998

[54] CALIBRATION GAGE FOR CALIBRATING A DEVICE FOR READING OFF EYEGLASS FRAME CONTOURS, AND CORRESPONDING CALIBRATION METHOD

[75] Inventors: Laurent Guillermin, Paris; Henri Hougas, Ozoir la Ferriere; Patrick Horel, Levallois Perret, all of France

[73] Assignee: Essilor International Compagnie Generale d'Optique, Charenton le Pont, France

[21] Appl. No.: 668,843

[22] Filed: Jun. 24, 1996

[30] Foreign Application Priority Data

Jun. 23, 1995 [FR] France .................... 95 07555

[51] Int. Cl.$^6$ .................................. G01B 5/00
[52] U.S. Cl. .......................... 33/502; 33/200
[58] Field of Search .............. 33/200, 502, 507, 33/562, 567; 73/1.79, 1.81

[56] References Cited

U.S. PATENT DOCUMENTS

| 1,946,432 | 2/1934 | Aldeborgh | 33/567 |
| 2,840,916 | 7/1958 | Mueller | 33/567 |
| 3,286,354 | 11/1966 | Richter | 33/567 |
| 4,625,418 | 12/1986 | Joncour et al. | 33/200 |
| 5,121,548 | 6/1992 | Daboudet | 33/507 |
| 5,121,550 | 6/1992 | Wood | 33/551 |
| 5,138,770 | 8/1992 | Matsuyama | 33/200 |
| 5,301,437 | 4/1994 | Burke | 33/562 |
| 5,307,150 | 4/1994 | Lecerf et al. | 33/200 |

FOREIGN PATENT DOCUMENTS

| 424207 | 4/1991 | European Pat. Off. . |
| 2669999 | 6/1992 | European Pat. Off. . |
| 639754 | 2/1995 | European Pat. Off. . |
| 3261814 | 11/1991 | Japan | 33/1 M |

*Primary Examiner*—Thomas B. Will
*Attorney, Agent, or Firm*—Young & Thompson

[57] ABSTRACT

A calibration gage for calibrating a device for reading off the contours of eyeglass frames is designed to be fitted to the contour reading off device to be calibrated in place of an eyeglass frame. It includes a plate with at least two ribs projecting from it. The ribs are generally parallel to each other in a first direction and spaced from each other in a second direction. By reading off the known dimensions between their inside and outside flanks, it is possible to determine some parameters of the contour reading off device.

22 Claims, 2 Drawing Sheets

5,802,731

CALIBRATION GAGE FOR CALIBRATING A DEVICE FOR READING OFF EYEGLASS FRAME CONTOURS, AND CORRESPONDING CALIBRATION METHOD

BACKGROUND OF THE INVENTION

1. Field of the Invention

The present invention is generally concerned with the calibration that must be carried out on first using a device for reading off eyeglass frame contours to obtain a precise reference for its various parameters, it being understood, of course, that such calibration can afterwards be repeated periodically as and when required.

It is more precisely concerned with the calibration of a device for reading off eyeglass frame contours including two parallel generally elongate jaws at least one of which is mobile transversely to their lengthwise direction and a feeler that is carried by a read carriage moving linearly on a turntable rotating on a transfer carriage moving linearly along a path that is generally parallel to the lengthwise direction of the jaws.

2. Description of the Prior Art

Insofar as the jaws are concerned, a contour reading off device of this kind is described in French patent application number 91 05619, filed 7 May 1991, published under the number 2 665 387, for example.

Insofar as the feeler is concerned, a contour reading off device of the kind concerned is described in French patent application number 89 13079, filed 6 Oct., 1989, published under the number 2 652 893, for example.

The above contour reading off device in practice employs polar coordinates for the position of the feeler, the read carriage carrying the feeler giving the radius and the turntable carrying the read carriage giving the angle.

The problems that arise relate to the fact that the position of the active part of the feeler, i.e. the point, relative to the center of the turntable, chosen as the center of the polar coordinates, is not known with the required certainty and likewise the position relative to the frame of the system of the jaw which, intended to bear against the lower part of the eyeglass frame whose contour is to be read off, is chosen to provide a reference axis, and to the fact that the jaw is not necessarily strictly parallel to the path of the transfer carriage moving the feeler between the rims or surrounds of the eyeglass frame.

This lack of parallelism can inadvertently introduce a difference of "altitude" into the successive readings for these rims or surrounds.

To overcome these problems it is necessary to calibrate the contour reading off device.

An object of the present invention is a calibration gage suitable for such calibration and a calibration method using it.

SUMMARY OF THE INVENTION

The invention consists in a calibration gage for calibrating a contour reading off device including two generally elongate parallel jaws at least one of which is mobile transversely to their lengthwise direction and a feeler carried by a read carriage mobile linearly on a turntable rotatable on a transfer carriage mobile linearly along a path substantially parallel to a lengthwise direction of said jaws, said calibration gage being adapted to be fitted to said contour reading off device to be calibrated in place of an eyeglass frame and including a plate with at least two transverse ribs projecting therefrom which are substantially parallel to each other in a first direction and spaced from each other in a second direction.

This second direction of the calibration gage of the invention being in practise parallel to the lengthwise direction of the jaws of the contour reading off device, the two transverse ribs of the calibration gage enable two dimensions to be measured, one between the inside flanks of these transverse ribs and the other between their outside flanks, and these two dimensions can be used to solve two equations in two unknowns giving the reference parameters of the read carriage carrying the feeler and thereby to determine the exact position of the point of the feeler relative to the center of the turntable carrying the read carriage.

The calibration gage of the invention has at least one other rib projecting from the plate, referred to hereinafter for convenience as the longitudinal rib, elongate in the second direction and thus in the lengthwise direction of the jaws of the contour reading off device.

In practise there are two parallel longitudinal ribs.

They are used to check the direction of the jaw providing the reference axis of the system.

They are also used to check that the path of the transfer carriage is parallel to that jaw.

Overall, the operations required to calibrate the contour reading off device to be checked are advantageously simplified by the use of the above device.

The features and advantages of the invention will become clear from the following description given by way of example and with reference to the appended diagrammatic drawings.

DETAILED DESCRIPTION OF THE INVENTION

Figure 1:
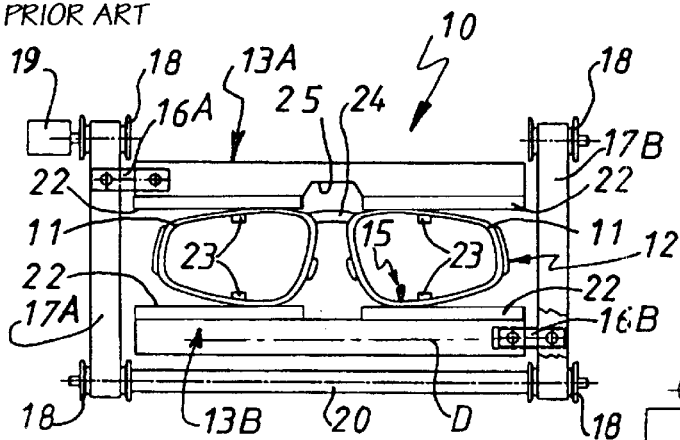
FIG. 1 is a locally cutaway simplified plan view of the jaws and the feeler of a device for reading off the contour of eyeglass frames to which the invention applies.

As shown diagrammatically in FIG. 1, the contour reading off device 10 to which the invention applies is more particularly intended for reading off the contour of both rims or surrounds 11 of any eyeglass frame 12.

It includes two jaws 13A, 13B for holding the eyeglass frame 12 and a feeler 15 for reading off their contour.

The two jaws 13A, 13B are parallel and generally elongate in a lengthwise direction D shown in chain-dotted line in FIG. 1.

So that they can grip the eyeglass frame 12 between them, in the general plane of the front face of the frame, at least one of the jaws 13A, 13B is mobile transversely to their lengthwise direction D.

In the embodiment shown both the jaws 13A, 13B are mobile transversely to the lengthwise direction D.

To this end, each is coupled by a respective bracket 16A, 16B to a respective belt 17A, 17B generally elongate perpendicularly to the lengthwise direction D, the two belts passing in an endless loop around pulleys 18.

For synchronous operation of the system one of the pulleys 18 of the belt 17A is keyed to the output shaft of a drive motor 19 so as to rotate with it; the other is keyed to a transmission shaft 20, to rotate with it, the corresponding pulley 18 of the belt 17B being also keyed to the transmission shaft 20 to rotate with it.

To move the jaws 13A, 13B in opposite directions, the bracket 16A of the jaw 13A is coupled to the top run of the belt 17A and the bracket 16B of the jaw 13B is coupled to the bottom run of the belt 17B.

In the embodiment shown each of the jaws 13A, 13B carries two spaced projecting bearing blocks 22 which contact the rims or surrounds 11 of the eyeglass frame 12 to be gripped.

To hold the eyeglass frame 12 perpendicular to the plane of the jaws 13A, 13B, in the embodiment shown the bearing blocks 22 of each of the jaws 13A, 13B are associated with two gripper fingers 23 offset in height perpendicular to this plane and at least one of which is mobile.

In the embodiment shown, the jaw 13A is in practice adapted to engage the top of the eyeglass frame 12, i.e. the side of the latter with the bridge 24, and for this reason is referred to hereafter as the top jaw.

In the embodiment shown, and for reasons that will emerge below, the top jaw 13A has a generally trapezoidal recess 25 in its middle part, between its bearing blocks 22.

The jaw 13B is adapted to engage the bottom of the eyeglass frame 12 and is therefore referred to hereafter as the bottom jaw.

In practise the bottom jaw 13B provides a reference axis for the system.

The feeler 15 has a point 26 and a heel 28 at diametrally opposed positions. It is mounted at the end of an axially mobile support rod 29 (FIG. 5) and the support rod 29 is carried by a read carriage 30 mobile linearly on a turntable 31 (FIG. 2).

Figure 2:
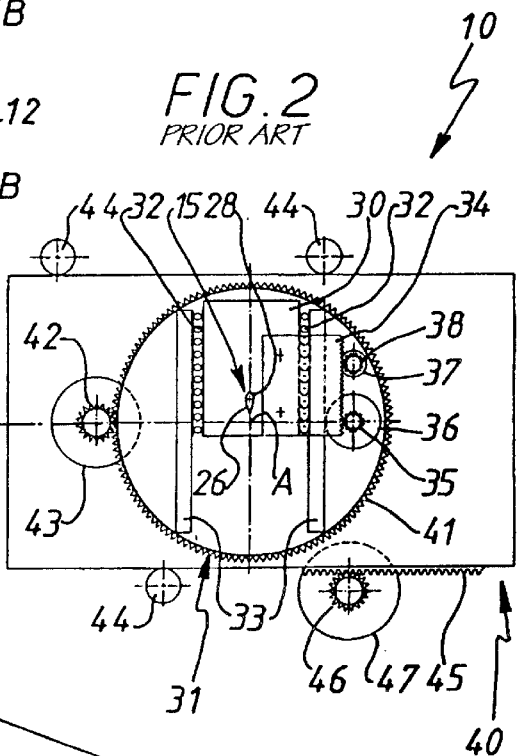
FIG. 2 is a simplified plan view of the component parts of this contour reading off device for moving its feeler in a system of polar coordinates.

As shown diagrammatically in FIG. 2, the read carriage 30 is engaged by means of rolling members 32 with two parallel slideways 33 attached to the turntable 31, for example.

It includes a rack 34 meshing with a pinion 35 keyed to the output shaft of a drive motor 36.

An associated encoder 37 identifies its position.

In the embodiment shown the encoder 37 has a pinion 38 meshing with the rack 34.

It could equally well be driven directly by the drive motor 36, however.

The circular turntable 31 rotates on a transfer carriage 40 moving along a linear path T generally parallel to the lengthwise direction D of the jaws 13A, 13B.

The turntable 31 has a rotation axis A.

The position of the axis A is indicated in FIG. 2.

The path T of the transfer carriage 40 is shown diagrammatically in chain-dotted line in FIG. 2.

The turntable 31 is driven by a rack 41 at its periphery meshing with a pinion 42 keyed to the output shaft of a drive motor 43.

The transfer carriage 40 is guided by rollers 44, for example, as shown diagrammatically in FIG. 2.

It is driven by a rack 45 meshing with a pinion 46 keyed to the output shaft of a drive motor 47.

The above arrangements are either well known in themselves or will be obvious to the person skilled in the art.

Moreover, as they do not form any part of the present invention they will not be described in further detail here.

The invention makes use of a calibration gage 48 to calibrate the contour reading off device 10.

The calibration gage 48 is designed to be fitted to the contour reading off device 10 to be calibrated in place of an eyeglass frame 12.

It includes a generally rectangular plate 50 with a flange 51 perpendicular to the plate 50 along at least one edge. The flange projects from both sides of the plate 50 and has a notch 52 where it crosses the plate dividing it into two lugs 53.

In the embodiment shown there are in practise four rims 51 divided into lugs 53, one at each corner of the plate 50.

Figure 4:
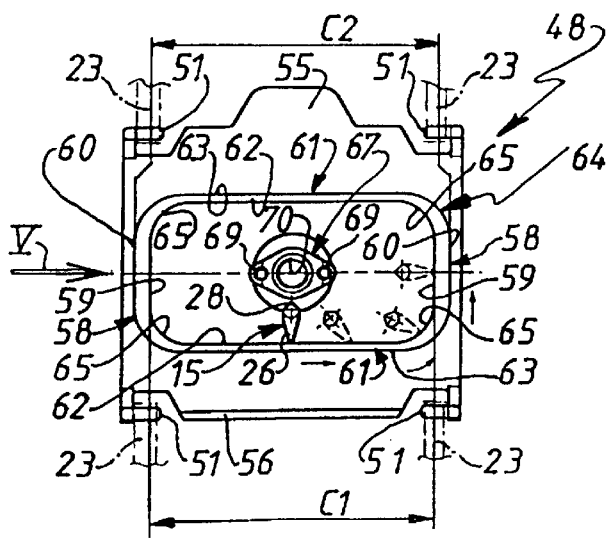
FIG. 4 is a bottom view of the calibration gage in place on the contour reading off device to be checked, in a first phase of the calibration of the latter.

They are adapted to cooperate with the respective gripper fingers 23 of the contour reading off device 10, one of the corresponding gripper fingers 23 being inserted in the notch 52 and the other bearing on one of the lugs 53, as shown diagrammatically in chain-dotted outline in FIG. 4.

In the embodiment shown the lugs 53 on the flanges 51 project inwards.

They could equally well project outwards, however.

Be this as it may, the rims 51 are coplanar in pairs at the ends of two opposite edges of the plate 50.

In practise these are the longitudinal edges of the plate 50, i.e. the edges of the plate 50 intended to be parallel to the jaws 13A, 13B of the contour reading off device 10.

In the embodiment shown the plate 50 has projecting from one of its longitudinal edges a localized centering protuberance 55 which is adapted to engage with the recess 25 in the jaw 13A of the contour reading off device 10 and has a generally trapezoidal contour, like the latter.

In the embodiment shown the calibration gage 48 of the invention has a flange 56 on the other longitudinal edge of the plate 50, between the flanges 51. Projecting on only one side of the plate 50, the flange 56 bears on the bottom jaw 13B of the contour reading off device 10, to be more precise on the bearing blocks 22 of the jaw 13B.

Figure 3:
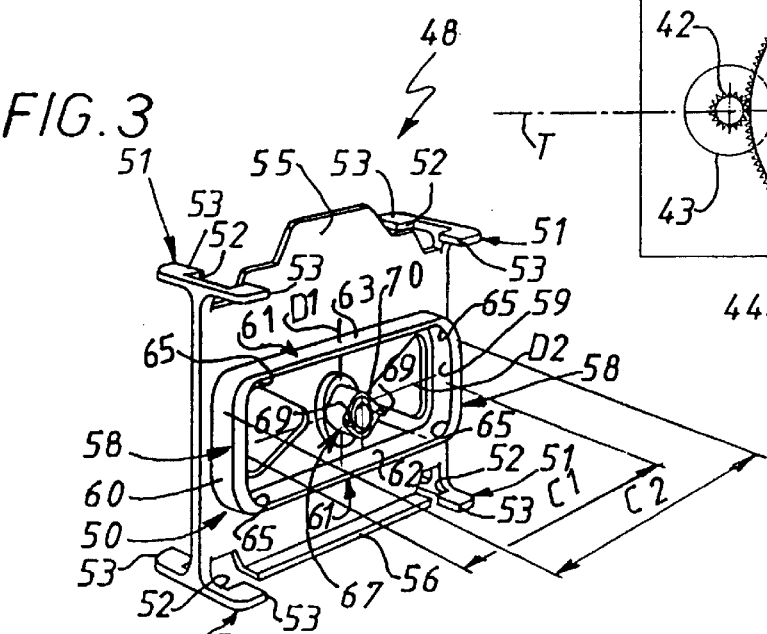
FIG. 3 is a perspective view of the calibration gage of the invention to a different scale.

The calibration gage 48 of the invention has at least two ribs 58 referred to herein for convenience as transverse ribs projecting from the middle area of the plate 50, on the same side of the latter as the rim 56, and generally parallel to each other in a first direction D1 shown in FIG. 3, being offset relative to each other in a second direction D2 also shown in FIG. 3.

The transverse ribs 58 are in practise rectilinear and when the calibration gage 48 is fitted to the contour reading off device 10 their direction D1 is perpendicular to the lengthwise direction D of the jaws 13A, 13B of the latter.

The transverse ribs 58 in practise have straight flanks 59, 60 perpendicular to the plate 50.

The distance between their inside flanks 59 is C1 and that between their outside flanks 60 is C2.

These dimensions C1, C2 are known with great accuracy.

In the embodiment shown the transverse ribs 58 are the same thickness, but this is not mandatory.

The transverse ribs 58 are in practise near respective transverse edges of the plate 50 and the centering protuberance 55 of the latter is substantially half-way between them.

In the embodiment shown the calibration gage 48 of the invention has at least one further rib 61 projecting from the same side of the plate 50 as the transverse ribs 58 and therefore as the flange 56, the rib 61 being elongate in the second direction D2, i.e. in the direction along which the transverse ribs 58 are spaced.

The longitudinal rib 61 is in practise rectilinear and when the calibration gage 48 of the invention is fitted to the contour reading off device 10 it is substantially parallel to the lengthwise direction D of the jaws 13A, 13B of the latter.

In other words, the longitudinal rib 61 is substantially orthogonal to the transverse ribs 58.

To put this another way, the direction D2 in which the transverse ribs 58 are spaced is orthogonal to the direction D1 in which they extend.

In the embodiment shown the calibration gage 48 of the invention in practice has two spaced longitudinal ribs 61 projecting from its plate 50.

Both the longitudinal ribs 61 have straight flanks 62, 63 perpendicular to the plate 50.

In the embodiment shown they are both the same thickness, and thinner than the transverse ribs 58, but this is not mandatory.

In practice, the two transverse ribs 58 and the two longitudinal ribs 61 are continuous and therefore together form a frame 64 with corners 65 where they merge that in the embodiment shown are rounded with a large radius.

Figure 10:
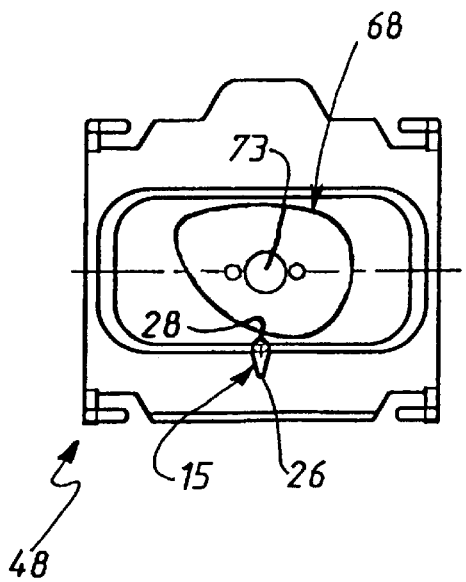
FIGS. 10 and 11 are views respectively analogous to those of FIGS. 4 and 5 and showing another way of using the calibration gage of the invention.
Figure 11:
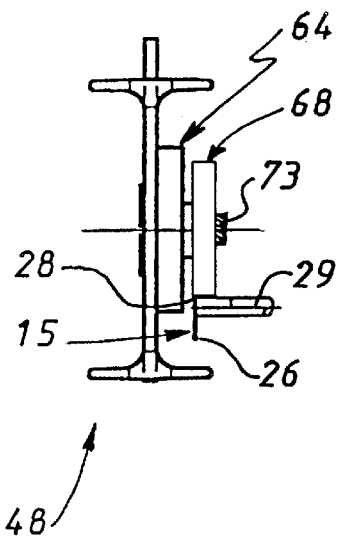

In the embodiment shown, the calibration gage 48 of the invention has a boss 67 projecting from the plate 50 at the center of the frame 64 and equipped with two parallel projecting pins 69 to receive a template 68, as shown in FIGS. 10 and 11.

In the embodiment shown the boss 67 has a screwthreaded hub 70 axially between the pins 69.

When, as here, the calibration gage 48 of the invention is made from a synthetic material, the hub 70 is in the form of an insert, for example. This is not mandatory, however.

With the calibration gage 48 of the invention fitted to the contour reading off device 10 to be calibrated, the procedure to be followed is as follows.

Figure 5:
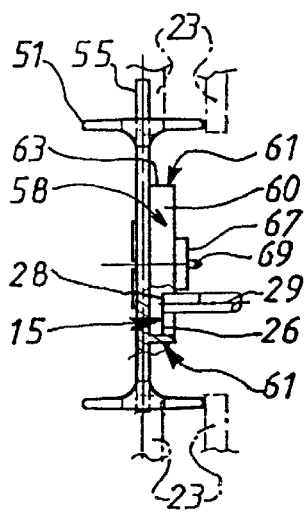
FIG. 5 is a locally cutaway side view of the gage in the direction of the arrow V in FIG. 4.

First of all, the point 26 of the feeler 15 is used to read off the dimension C1, as shown diagrammatically in FIGS. 4 and 5, operating inside the frame 64.

Figure 6:
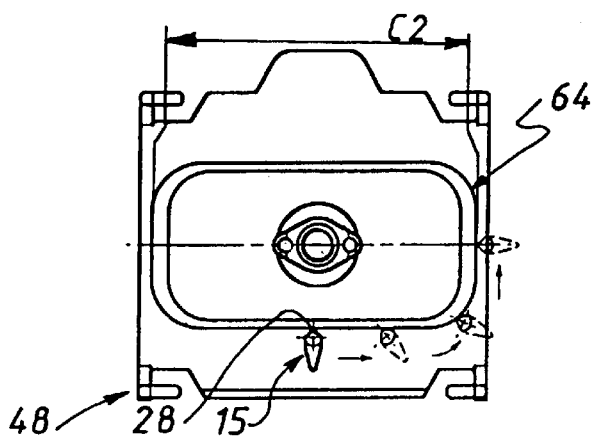
FIGS. 6 and 7 are views respectively analogous to those of FIGS. 4 and 5 and relating to another phase of the calibration of the contour reading off device.
Figure 7:
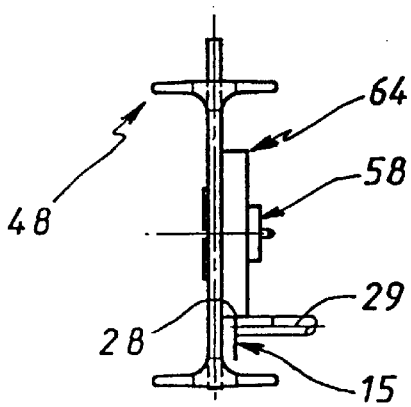

Next, the heel 28 of the feeler 15 is used to read off the dimension C2, as shown diagrammatically in FIGS. 6 and 7, operating outside the frame 64.

Each value read off depends on the resolution of the encoder 37 and departs from the exact value by a systematic read error.

However, with regard to these two parameters (the resolution and the error), the two values read off enable the two parameters to be determined in a very simple manner, by entering them into two equations.

Figure 8:
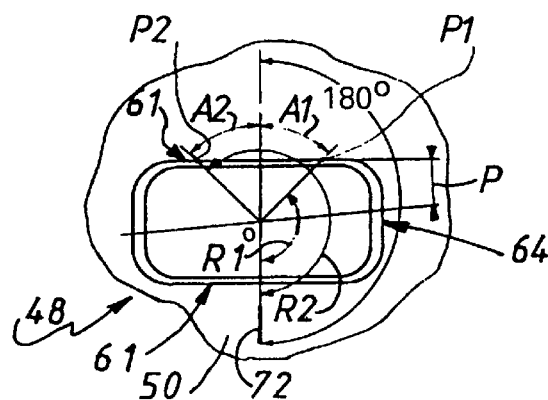
FIGS. 8 and 9 are partial bottom views analogous to those of FIGS. 5 and 7 for further phases of the calibration.

As shown diagrammatically in FIG. 8, the turntable 31 is initially in bearing engagement with an origin abutment 72 indicated by a thick black line in FIG. 8 and is successively positioned at two points P1, P2 on the longitudinal rib 61 opposite the abutment 72, the point P1 corresponding to a rotation R1 of the turntable 31 equal to 180° minus an angle A1 and the point P2 corresponding to a rotation R2 equal to 180° plus an angle A2 equal to the angle A1.

The angles A1, A2 are equal to 45°, for example.

Be this as it may, the points P1, P2 are symmetrical about the median line of the longitudinal ribs 61.

The positions of the two points P1, P2 read off from the longitudinal rib 61 give its slope P and therefore that of the reference axis of the system.

Figure 9:
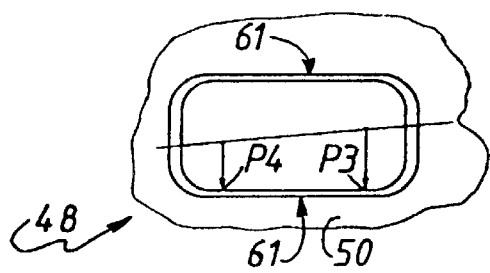

As shown diagrammatically in FIG. 9, reading off two points P3, P4 on a longitudinal rib 61 then checks whether the path T of the transfer carriage 40 is parallel to this reference axis.

As shown diagrammatically in FIGS. 10 and 11, the calibration gage 48 of the invention can also be used to support a template 68 to read off its contour.

The template 68 is preferably held in place by a screw 73 screwed into the screwthreaded hub 70.

Of course, the present invention is not limited to the embodiment described and shown, but embodies any variant execution thereof.

There is claimed:

1. In an eyeglass frame contour reading off device of the type including two generally elongate parallel jaws, at least one of the jaws being mobile transversely to the parallel jaws, a transfer carriage mobile linearly along a path substantially parallel to said parallel jaws, a read carriage mobile linearly on a turntable rotatable on said transfer carriage, a feeler carried by the read carriage and selectively cooperable with a rim groove of an eyeglass frame adapted to be clamped between the jaws, the invention comprising a calibration gage cooperable with the parallel jaws in place of an eyeglass frame, said calibration gage comprising a plate with at least two transverse ribs projecting therefrom, said ribs being substantially parallel to each other in a first direction and spaced from each other in a second direction, said at least two transverse ribs being selectively cooperable with said feeler for calibrating the contour reading off device.

2. Calibration gage according to claim 1 wherein said transverse ribs have straight flanks perpendicular to said plate.

3. Calibration gage according to claim 1 wherein said transverse ribs are rectilinear.

4. Calibration gage according to claim 1 further comprising at least one longitudinal rib projecting from said plate and elongate in said second direction.

5. Calibration gage according to claim 4 wherein said longitudinal rib has straight flanks perpendicular to said plate.

6. Calibration gage according to claim 4 wherein said longitudinal rib is rectilinear.

7. Calibration gage according to claim 4 wherein said longitudinal rib is substantially orthogonal to said transverse ribs.

8. Calibration gage according to claim 4 having two spaced longitudinal ribs projecting from said plate.

9. Calibration gage according to claim 8 wherein said two transverse ribs and said two longitudinal ribs are continuous with each other and together form a frame.

10. Calibration gage according to claim 9 wherein the corners of said frame are rounded.

11. Calibration gage according to claim 1 having a boss projecting from said plate and provided with two parallel pins to receive a template.

12. Calibration gage according to claim 11 wherein said boss has a screwthreaded hub axially between said pins.

13. Calibration gage according to claim 9 having a boss projecting from said plate and provided with two parallel pins to receive a template, said boss being at the center of said frame.

14. Calibration gage according to claim 1 wherein said plate has a localized centering protuberance projecting from the edge of one side thereof.

15. Calibration gage according to claim 14 wherein said centering protuberance of said plate is substantially half-way between said transverse ribs.

16. Calibration gage according to claim 14 wherein said centering protuberance of said plate has a substantially trapezoidal contour.

17. Calibration gage according to claim 1 having a flange perpendicular to said plate along at least one edge thereof, such flange projecting to each side of said plate and having a notch in line with said plate defined in said flange.

18. Calibration gage according to claim 17 having four said flanges, one at each corner of said plate.

19. A calibration gage for calibrating an eyeglass frame contour reading off device, comprising a plate having along upper and lower portions thereof parallel jaw engagement surfaces cooperable with the respective jaws of an eyeglass frame reading off device, at least two transverse ribs disposed between said parallel jaw engagement surfaces and projecting from said plate, said ribs being substantially parallel to each other in a first direction and spaced from each other in a second direction, said ribs defining a feeler pathway selectively cooperable with a feeler of an eyeglass frame contour reading off device for calibrating the contour reading off device.

20. A method for calibrating an eyeglass frame contour reading off device of the type including two generally elongate parallel jaws, at least one of the jaws being mobile transversely to the parallel jaws, a transfer carriage mobile linearly along a path substantially parallel to said parallel jaws, a read carriage mobile linearly on a turntable rotatable on said transfer carriage, a feeler carried by the read carriage and selectively cooperable with a rim groove of an eyeglass frame adapted to be clamped between the jaws, a calibration gage cooperable with the parallel jaws in place of an eyeglass frame, the calibration gage comprising a plate with at least two transverse ribs projecting therefrom, the ribs being substantially parallel to each other in a first direction and spaced from each other in a second direction, the method comprising the steps of:

inserting the calibration gage between the parallel jaws of the contour reading off device and tightening the jaws;

bringing the feeler selectively into engagement with the at least two transverse ribs and thereafter displacing the feeler for calibrating the eyeglass frame for reading off contour device therealong and thereafter removing the calibration gage before inserting between the jaws an eyeglass frame for reading off the contour of the rims thereof.

21. A calibration gage for calibrating an eyeglass frame contour reading off device, comprising a plate having parallel upper and lower portions thereof cooperable with the respective jaws of an eyeglass frame reading off device, ribs defining a continuous feeler pathway disposed between the upper and lower portions of the plate and projecting from said plate, at least portions of said ribs being substantially parallel to each other in a first direction and spaced from each other in a second direction, said feeler pathway being cooperable with a feeler of an eyeglass frame contour reading off device for calibrating the contour reading off device.

22. A calibration gage for calibrating an eyeglass frame contour reading off device, comprising a plate, ribs projecting from said plate, including two transverse ribs substantially parallel to each other, and two longitudinal ribs substantially parallel to each other and substantially perpendicular to said transverse ribs, said longitudinal and transverse ribs being joined to one another and forming a frame defining a feeler pathway cooperable with a feeler of an eyeglass frame contour reading off device.

* * * * *